(12) United States Patent
Ling et al.

(10) Patent No.: US 10,389,449 B2
(45) Date of Patent: *Aug. 20, 2019

(54) HYBRID DIRECT-MODULATED/EXTERNAL MODULATION OPTICAL TRANSCEIVER

(71) Applicant: Maxlinear, Inc., Carlsbad, CA (US)

(72) Inventors: Curtis Ling, Carlsbad, CA (US); Anand Anandakumar, Carlsbad, CA (US); Ioannis Spyropoulos, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/135,338

(22) Filed: Sep. 19, 2018

(65) Prior Publication Data

US 2019/0013867 A1 Jan. 10, 2019

Related U.S. Application Data

(63) Continuation of application No. 15/185,487, filed on Jun. 17, 2016, now Pat. No. 10,116,390.

(Continued)

(51) Int. Cl.
*H04B 10/2507* (2013.01)
*H04B 10/40* (2013.01)
(Continued)

(52) U.S. Cl.
CPC ......... *H04B 10/40* (2013.01); *H04B 10/0795* (2013.01); *H04B 10/2507* (2013.01);
(Continued)

(58) Field of Classification Search
None
See application file for complete search history.

(56) References Cited

U.S. PATENT DOCUMENTS 5,077,619 A * 12/1991 Toms ................... H04B 10/504
398/159
5,166,509 A 11/1992 Curran
(Continued)

OTHER PUBLICATIONS

Profile Inc., Basic Notes Laser Diodes, 2000.
(Continued)

*Primary Examiner* — Kenneth N Vanderpuye
*Assistant Examiner* — Jai M Lee
(74) *Attorney, Agent, or Firm* — McAndrews, Held & Malloy, Ltd.

(57) ABSTRACT

Aspects of a method and system for feedback during optical communications are provided. In one embodiment, a system for optical communications comprises a predistortion module, a feedback subsystem, a transmit optical subsystem, and an external modulator. The predistortion module is operable to receive an input digital signal and modify the input digital signal to produce a digital predistorted signal. The transmit optical subsystem is operable to generate an optical signal from the digital predistorted signal. The modification of the input digital signal is dynamically controlled by the feedback subsystem according to one or more characteristics of the optical signal as determined by the feedback subsystem. The amplitude of the external modulator output is also dynamically controlled by the feedback subsystem.

20 Claims, 5 Drawing Sheets

Related U.S. Application Data (60) Provisional application No. 62/182,128, filed on Jun. 19, 2015.

(51) Int. Cl.

| | | |
|---|---|---|
| *H04B 10/516* | (2013.01) | |
| *H04B 10/58* | (2013.01) | |
| *H04B 10/69* | (2013.01) | |
| *H04B 10/079* | (2013.01) | |
| *H04B 10/2513* | (2013.01) | |

(52) U.S. Cl.
CPC ..... *H04B 10/25133* (2013.01); *H04B 10/516* (2013.01); *H04B 10/58* (2013.01); *H04B 10/6911* (2013.01)

(56) References Cited

U.S. PATENT DOCUMENTS

| | | | |
|---|---|---|---|
| 5,293,545 A | 3/1994 | Huber | |
| 5,526,162 A * | 6/1996 | Bergano | H04B 10/532 398/154 |
| 5,768,449 A * | 6/1998 | Fuse | H04B 10/504 385/1 |
| 5,917,637 A | 6/1999 | Ishikawa | |
| 6,998,909 B1 * | 2/2006 | Mauer | H03F 1/3247 330/149 |
| 7,200,339 B1 * | 4/2007 | Roberts | H04B 10/505 398/158 |
| 7,412,174 B2 | 8/2008 | Iannelli | |
| 9,331,788 B2 * | 5/2016 | Abe | H04B 10/50 |
| 9,559,780 B2 | 1/2017 | Schemmann | |
| 9,735,879 B2 * | 8/2017 | Doany | H04B 10/508 |
| 10,116,390 B2 * | 10/2018 | Ling | H04B 10/25133 |
| 2002/0106148 A1 | 8/2002 | Schemmann | |
| 2003/0067651 A1 | 4/2003 | Wan | |
| 2003/0223763 A1 * | 12/2003 | Tanaka | H04B 10/504 398/186 |
| 2004/0223768 A1 * | 11/2004 | Shastri | G02F 1/0121 398/183 |
| 2005/0041984 A1 * | 2/2005 | Chandler | H04B 10/505 398/189 |
| 2005/0084202 A1 * | 4/2005 | Smith | B82Y 20/00 385/14 |
| 2005/0249508 A1 | 11/2005 | Volz | |
| 2006/0210282 A1 * | 9/2006 | Iannelli | H04B 10/505 398/186 |
| 2008/0193143 A1 | 8/2008 | Mahgerefteh | |
| 2008/0279566 A1 | 11/2008 | Miller | |
| 2009/0058521 A1 | 3/2009 | Fernandez | |
| 2009/0110408 A1 * | 4/2009 | Dallesasse | H04B 10/504 398/185 |
| 2010/0220952 A1 * | 9/2010 | Smith | H01S 5/0683 385/14 |
| 2012/0045223 A1 * | 2/2012 | Oku | H04B 10/504 398/201 |
| 2012/0224849 A1 * | 9/2012 | Rylyakov | H04B 10/2507 398/27 |
| 2015/0078758 A1 | 3/2015 | Lee | |
| 2016/0065311 A1 | 3/2016 | Winzer | |

OTHER PUBLICATIONS

Medhi, Von Neumann Architecture, 2012, http://www2.cs.siu.edu/~cs401/Textbook/ch2.pdf.
Schoolphysics, Intensity and Amplitude, 2013.

* cited by examiner

HYBRID DIRECT-MODULATED/EXTERNAL MODULATION OPTICAL TRANSCEIVER

CROSS REFERENCE TO RELATED APPLICATIONS

This application is a continuation of U.S. patent application Ser. No. 15/185,487, filed Jun. 17, 2016, which makes reference to, claims priority to, and claims benefit from U.S. provisional patent application Ser. No. 62/182,128, filed Jun. 19, 2015. Each of the aforementioned applications is incorporated herein by reference in its entirety.

BACKGROUND

Limitations and disadvantages of conventional and traditional approaches to optical communications will become apparent to one of skill in the art, through comparison of such systems with some aspects of the present invention as set forth in the remainder of the present application with reference to the drawings.

BRIEF SUMMARY OF THE INVENTION

Systems and methods are provided for a hybrid direct-modulated/external modulation optical transceiver, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1A:
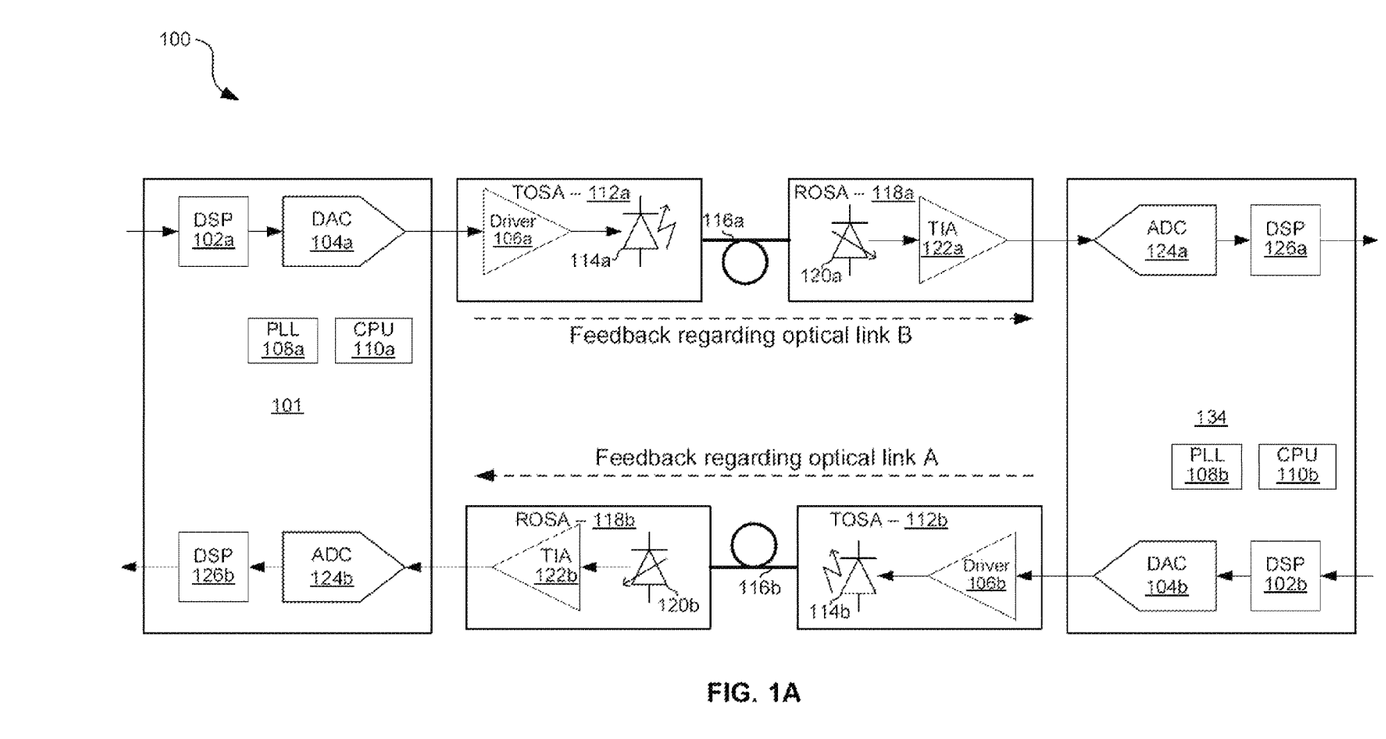
FIG. 1A shows a first example closed-loop optical communication system in accordance with aspects of this disclosure.

FIG. 1A shows a first example closed-loop optical communication system in accordance with aspects of this disclosure. The system 100 comprises a transmit electrical subsystem 101 and a receive electrical subsystem 134, transmit optical sub-assemblies (TOSAs) 112a and 112b, receive optical sub-assemblies (ROSAs) 118a and 118b, and optical fibers 116a and 116b.

Each of the subsystems 101 and 134 comprises a transmit digital signal processing circuit 102, a receive digital signal processing circuit 126, a digital-to-analog converter (DAC) 104, an analog-to-digital converter (ADC) 124, a PLL 108, and a CPU 110 (where the different instances of each component are labeled 'a' and 'b', respectively). Each TOSA 112 comprises a laser diode driver 106, and a laser diode 114. Each ROSA 118 comprises a photodiode 120, and a transimpedance amplifier 122. The TOSA 112a, optical fiber 116a, and ROSA 118a are collectively referred to as "optical link A" and TOSA 112b, optical fiber 116b, and ROSA 118b are collectively referred to as "optical link B."

Each of the CPUs 110a and 110b is operable to manage operations of a respective one the electrical subsystems 101 and 134. Such management may comprise, for example, each of the CPUs 110a and 110b receiving feedback via a respective one of the optical links and configuring its DSP 102, DSP 126, DAC 104, and ADC 124 based on the received feedback. Each of the CPUs 110 may also generate feedback signals based on output of its respective DSP 126.

Each PLL 108 is operable to generate one or more timing signals such as sample clocks for the DAC 104 and ADC 124.

Each DSP 102 is operable to receive one or more streams of data and process the data to generate a signal suitable for directly modulating a respective one of the TOSs 112.

Each DAC 104 is operable to convert the digital signal output by a respective one of DSPs 102 to generate an analog waveform. Example configuration and operation of the DACs 104 is described below with reference to FIGS. 3C and 4.

Each driver 106 is operable to suitably condition the output of DAC 104a for application to a respective one of laser diodes 114.

Each laser diode 114 may comprise a semiconductor laser that is operable to generate a light beam having an intensity that is proportional to the current output by its respective driver 106 and at a wavelength that coincides with a minimum of dispersion in the optical fiber. The laser may be modulated with a data signal to be communicated via the optical fiber, where bandwidth limitations are reduced due to low dispersion and attenuation. The input current to output optical power of a typical laser diode may be highly nonlinear and vary greatly over temperature. Methods and systems for dealing with such nonlinearity and temperature dependence are further discussed below.

Each photodiode 120 is operable generate an output current proportional to the intensity of light incident on it.

Each transimpedance amplifier 122 is operable to convert the current output by a respective photodiode 120 to a voltage with a suitable range for input to a respective one of the ADCs 124.

Each ADC 124 is operable to convert the analog voltage present at its input to a corresponding digital value.

Each DSP 126 is operable to perform various operations on the received signal output by its respective ADC 124. Each DSP 126 may be operable to analyze a received signal to determine various characteristics of the optical link over which it was received. Such characteristics may include, for example: a nonlinearity of the optical link (e.g., coefficients of a Volterra series that models the link) and a temperature of the laser diode 114 of the optical link. The nonlinearity may be determined by, for example, comparing received signals (e.g., pilots or decoded data) with expected signals. The temperature may be indirectly determined based on known behavior of the optical components over temperature and/or determined directly from a temperature measurement reported by the optical components (e.g., on a control or "out-of-band" channel). Each DSP 126 may output the determined characteristics of its respective optical link to its respective CPU for generation of a feedback signal to communicate the determined characteristics back to the other electrical subsystem.

Figure 1B:
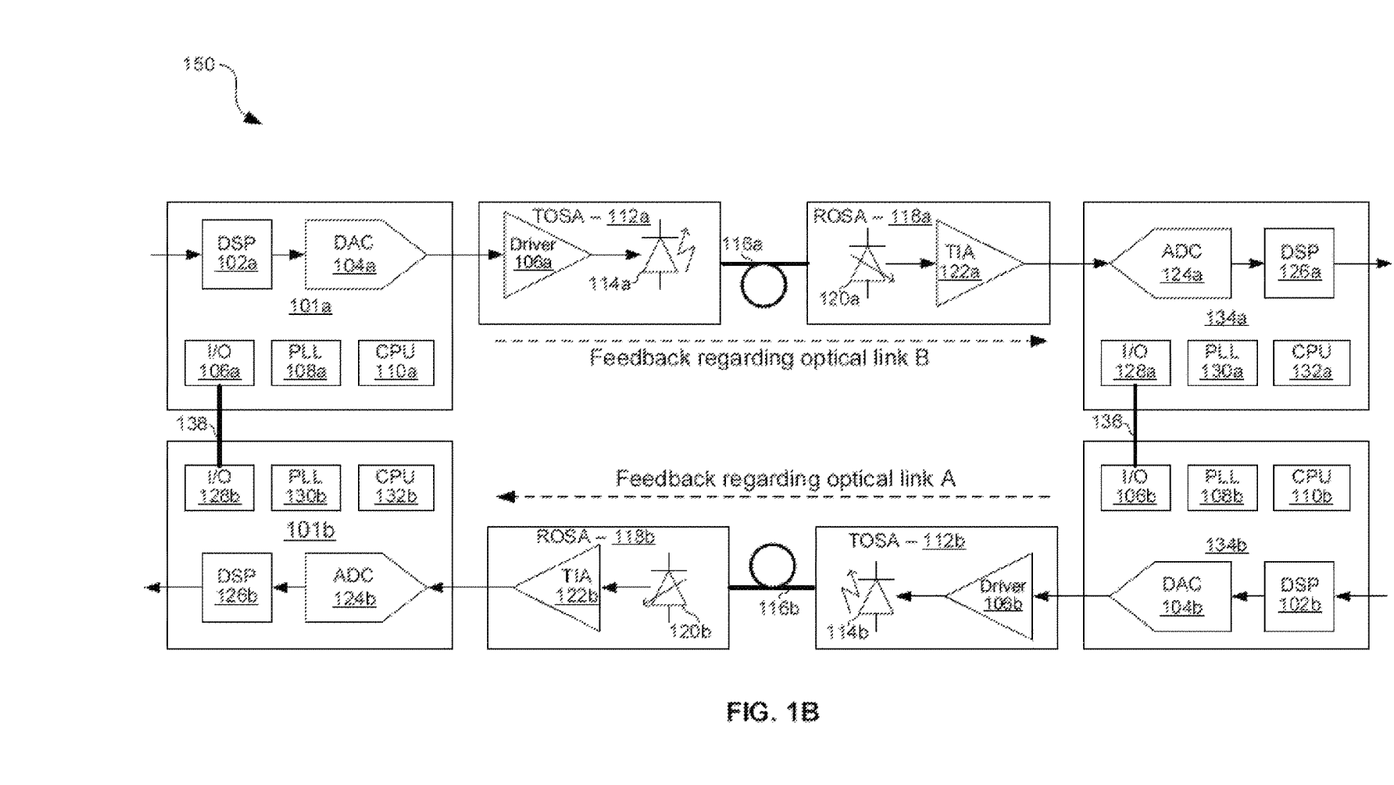
FIG. 1B shows a second example closed-loop optical communication system in accordance with aspects of this disclosure.

FIG. 1B shows a second example closed-loop optical communication system in accordance with aspects of this disclosure. The system 150 of FIG. 1B is similar to the system 100 of FIG. 1A except that electrical subsystem 101 is replaced by two discrete electrical subsystems 101a and 101b and electrical subsystem 134 is replaced by two discrete electrical subsystems 134a and 134b. In order to facilitate the feedback of the characteristics of the optical links, the electrical subsystems 101a and 101b comprise interface circuits 106a and 106b which are connected to each other via connection 138 and via which feedback about optical link A, received via optical link B, can be communicated to CPU 110a and used for configuring electrical subsystem 101a. Similarly, the electrical subsystems 134a and 134b comprise interface circuits 128a and 128b which are connected to each other via connection 136 and via which feedback about optical link B, received via optical link A, can be communicated to CPU 110b and used for configuring electrical subsystem 134b.

Figure 2:
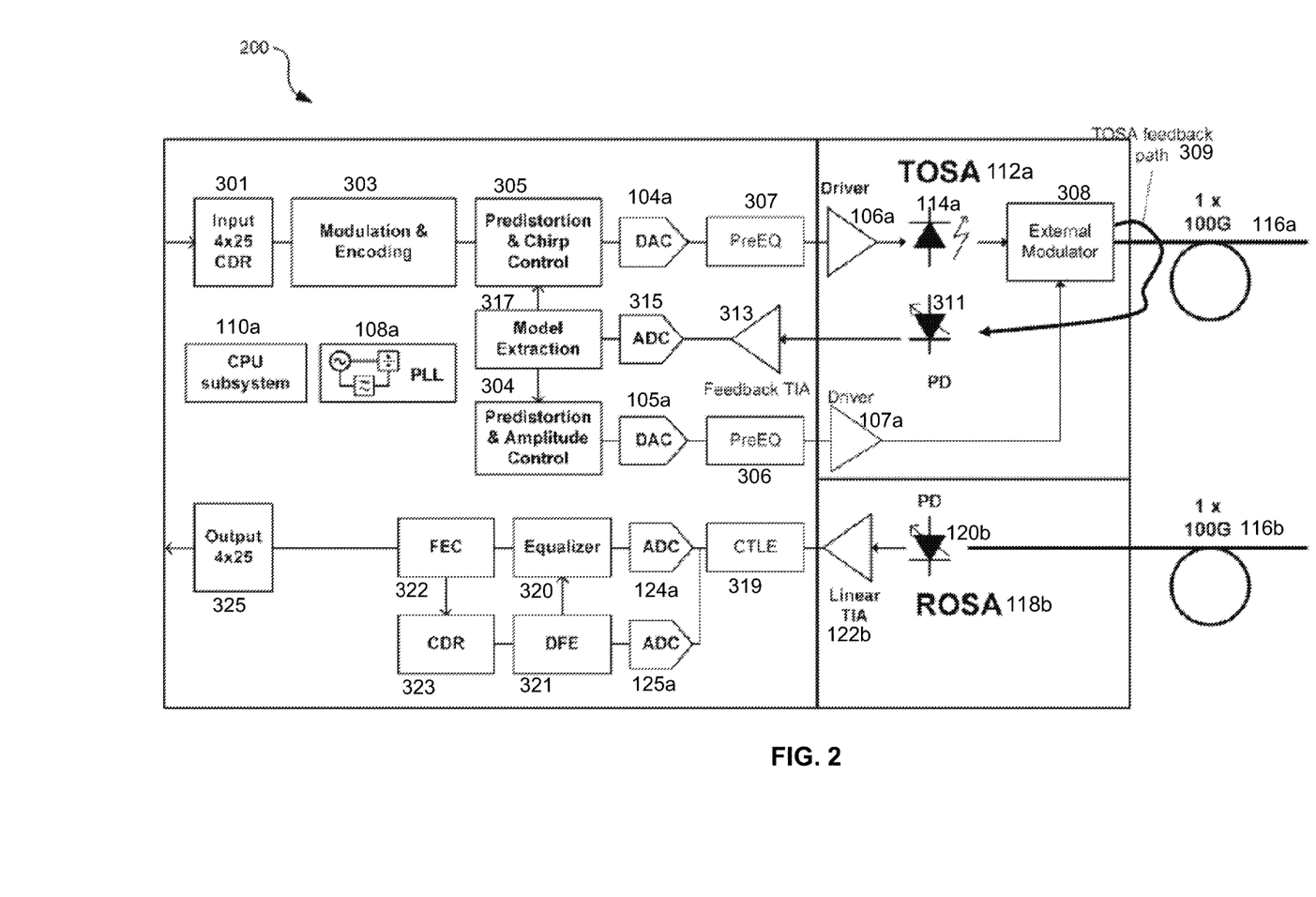
FIG. 2 shows an example optical communication system with a hybrid direct-modulated/external modulation optical transceiver, in accordance with aspects of the disclosure.

FIG. 2 shows an example optical communication system 200 with a hybrid direct-modulated/external modulation optical transceiver, in accordance with aspects of the disclosure. In optical communication system 200, a clock and data recovery (CDR) circuit 301 is operable to receive data in 4 channels, each channel operating at 25 Gbps. Forward error correction (FEC) is applied by a modulation and encoding module 303. PLL 108a may be operable to generate one or more timing signals such as sample clocks for the DACs 104a and 105a and ADCs 124a, 125a, and 315.

As compared to the system 100 and 150, the system 200 comprises two feedback paths directly from the TOSA to the transceiver chip so that a feedback path/channel is not required from the opposite end of the optical fibers.

Metro optical data links, in the range of 40-80 km, are becoming more important, but are not easily addressed because at this distance systems currently use coherent detection, or use multiple fibers at lower rates, which are both very expensive. The hybrid system disclosed herein and addresses the need for cost-effective systems that can operate in the metro space without the need for coherent systems. The disclosed system is "hybrid" because it combines direct modulation with external modulation.

In coherent detection, illuminated I and Q mixers (photodetectors) preserve the phase of the light and therefore can recover phase modulation of the light transmitted, the light being the carrier. Direct detection is an amplitude measurement without phase information. Direct detection alone is typically less robust over long distances. However, direct detection is cheaper and less complex than coherent detection. Coherent detection requires quadrature processing and a local oscillator, which adds cost and complexity to the receiver.

Direct modulation is a technique where the laser output power is modulated by directly modulating the current driving the photodiode. Direct modulation of the current changes the output power and also changes the frequency of the emitted light. The modulation of the current effectively modulates the phase of optical signals at the receiving end of the link. This frequency variation based on drive current is known as chirp. Chirp is computed by rate equations that take into consideration photon density, current, and charge carriers. Chromatic dispersion causes light of different frequencies to travel at different speeds along the fiber. For example, when a square pulse, comprising a frequency spectrum, is input to the fiber, a spread pulse results at the other end causing inter-symbol interference (ISI) and closing the eye opening.

It is therefore desirable to control the frequency and amplitude to minimize dispersion. This may be enabled by two control paths from a model extraction module 317. The system 200 comprises a TOSA feedback path 309 via a monitor photodiode 311 that monitors the output of an external modulator 308 and communicates an electrical signal back into the transceiver circuitry, which includes a feedback trans-impedance amplifier (TIA) 313, an analog-to-digital ADC 315, a model extraction module 317. In an alternative scenario, the input of the external modulator 308 may also be monitored. The monitor photodetector 311 may feed an electrical signal based on an optical signal at the input and/or output of the external modulator 308 back to a transceiver system-on-a-chip (SoC). The monitor photodetector 311 output is received by the feedback TIA 313 in the transceiver SoC, and the amplified signal output from the feedback TIA 313 is converted to a digital feedback signal by the ADC 315. The model extraction module 317 receives the digital feedback signal, which is utilized in two control paths to control the amplitude of the light into the fiber and reduce the chirp detected out of the fiber.

The model extraction module 317 may be operable to determine a relationship between the input of a current driver 106a and the input and/or output of the external modulator 308. This relationship may be nonlinear and/or temperature dependent. Such characteristics may include, for example: a nonlinearity of the optical link (e.g., coefficients of a Volterra series that models the link) and a temperature of the laser diode 114a of the optical link. The nonlinearity may be determined by, for example, comparing monitored signals (e.g., pilots or decoded data) with expected signals. The temperature may be indirectly determined based on known behavior of the optical components over temperature and/or determined directly from a temperature measurement reported by the optical components.

The model extraction module 317 may utilize the signal from the photodetector 311 monitoring the external modulator 308 to configure two closed-loop, local control paths. The monitor photodetector 311 may comprise a backside monitor photodiode that monitors a back facet of the laser diode 114a. An optical tap may also be utilized to couple a portion of the optical output of the laser diode 114a to the monitor photodiode 311. The monitor photodiode 311 may comprise a high-speed, high-bandwidth photodiode, i.e., on the order of the frequency of the optical signal, similar to the ROSA photodiode 120b. This is as compared to conventional backside monitor photodiodes that monitor laser output power changes with temperature, for example, which is a slow time-varying parameter. In this manner, the monitor photodiode 311 may directly measure high-frequency impairments from the laser diode 114a in the optical signal 116a and communicate this signal back to the driver circuitry 106a.

In a first closed-loop control path, the relationship between the input of the current driver 106a and the output of the external modulator 308 is input to a predistortion and chirp control module 305. The predistortion and chirp control module 305 applies a predistortion to the output of the modulation and encoding module 303 before digital-to-analog conversion. DAC 104a is operable to convert the digital signal output by the predistortion and chirp control module 305 to generate an analog waveform. A driver 106a is operable to suitably condition the output of the predistortion and chirp control module 305 for application to a laser diode 114a. The laser diode 114a is operable to generate a light beam having an intensity proportional to the current output by driver 106a. The light beam is modulated by external modulator 308 and transmitted over an optical fiber 116a. As the predistorted signal traverses the optical fiber 116a, it will experience the effects of chromatic dispersion, which causes light of different frequencies to travel at different speeds along the fiber. By the time the predistorted signal arrives at the receiver, the chromatic dispersion transforms the predistorted signal back into a near-ideal signal that the receiver intended to see. An estimate of the dispersion caused by the optical channel is modeled. Frequencies that travel faster may be delayed according to this dispersion model, thereby compensating for dispersion over the optical fiber.

In addition to minimizing the dispersion at the receiver, the frequency predistortion at the input of the current driver 106a also minimizes digital sideband (DSB) nulls at the receiver. The DSB null suppression may result is a waveform that has an asymmetric phase at the fiber input and a symmetric phase at the fiber output. Predetermined equalizer values may also be applied to the analog predistorted signal in a pre-equalizer 307 to improve equalizer performance at the receiver side. As a result of the predistortion and/or pre-equalization, an amplitude shift may occur at the external modulator 308 output.

The amplitude of the light into the fiber may be controlled in a second closed-loop control path. In the second control path, the relationship between the input of the current driver 106a and the output of the external modulator 308 is input to a predistortion and amplitude control module 304. The predistortion and amplitude control module 304 may control the external modulator 308 through a DAC 105a, a pre-equalizer 306, and a driver 107a. The predistortion and amplitude control module 304 may counteract the resulting amplitude shift from the first control loop, thereby generating a constant envelope optical signal into the fiber.

Therefore, the feedback path 309 may be utilized to configure both the laser source and the external modulator 308. The system 200 therefore cascades direct modulation with external modulation 308 to provide a constant light amplitude into the fiber but with configurable wavelength. In this manner, 80 km direct detection is enabled, and dispersion effects such as DSB nulls may be mitigated, as the frequency transmitted can be accurately controlled without the shift in amplitude into the fiber.

The optical transceiver circuitry also includes a receiver section operable to receive a signal from an optical fiber 116b via a photodetector 120b and a linear TIA 122b. The receiver section comprises a continuous time linear equalizer 319 and one or more ADCs 124a and 125a the feed a digital processor operable to equalize and decode. The digital processor may comprise an equalizer 320, a speculative digital front end (DFE) 321, an FEC decoder 322, a clock and data recover (CDR) module 323, and a output demultiplexer 325.

Figure 3:
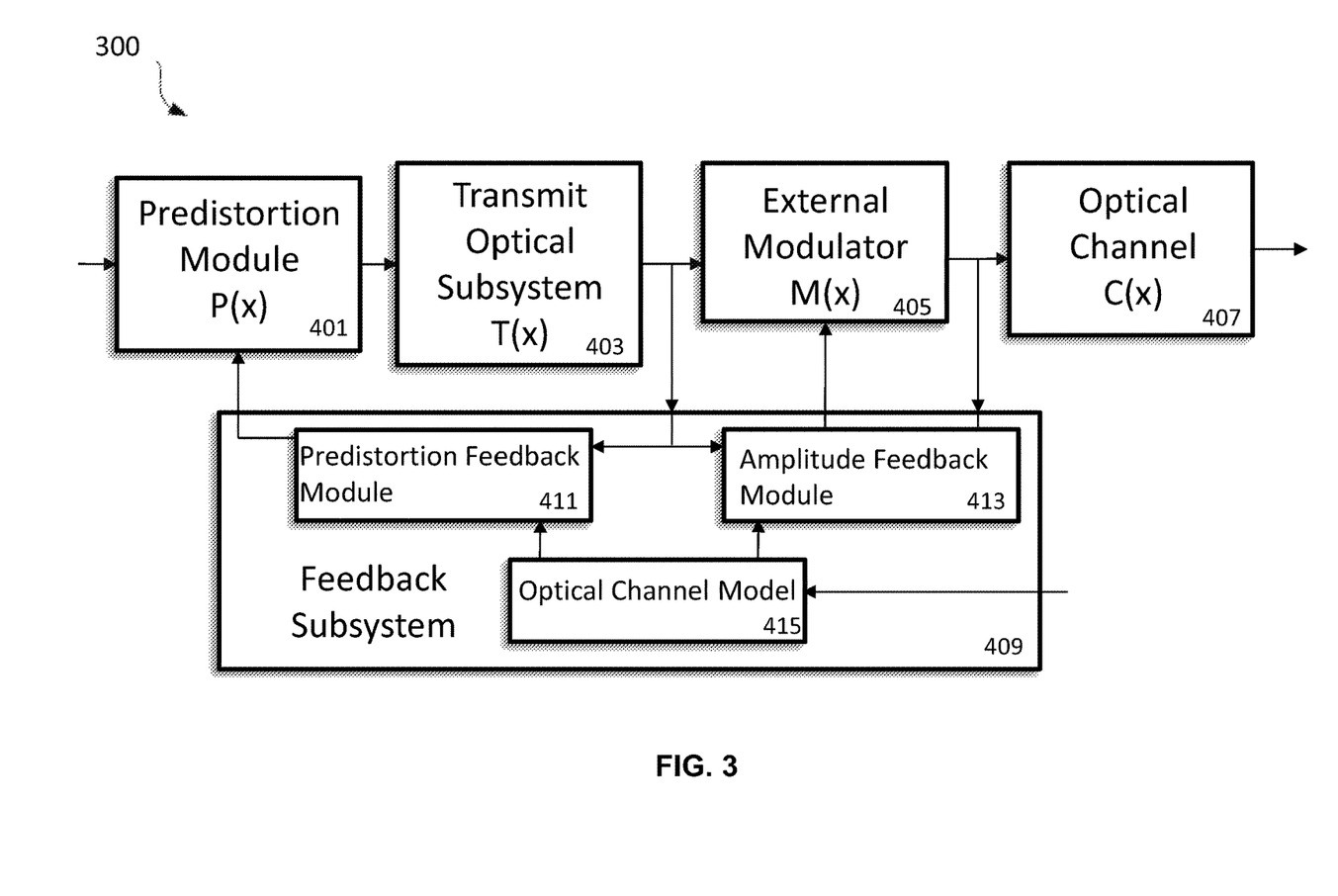
FIG. 3 shows another example optical communication system with an external modulation optical transceiver, in accordance with aspects of the disclosure.

FIG. 3 shows another example optical communication system 300 with an external modulation optical transceiver, in accordance with aspects of the disclosure. In optical communication system 300, aspects of a system for feedback during optical communications are provided. The disclosed optical communication system 300 combines direct modulation with external modulation. Optical communication system 300 comprises a predistortion module 401, a transmit optical subsystem 403, and an external modulator 405, an optical channel 407, and a feedback subsystem 409. The predistortion module 401 is operable to receive an input digital signal and modify the input digital signal to produce a digital predistorted signal. The transmit optical subsystem 403 is operable to generate an optical signal from the digital predistorted signal. The modification of the input digital signal is dynamically controlled by the feedback subsystem 409 according to one or more characteristics of the optical signal as determined by the feedback subsystem. The amplitude of the output of the external modulator 405 is also dynamically controlled by the feedback subsystem 409. The output of the external modulator 405 is transmitted over the optical channel 407.

As compared to the system 100 and 150, the system 300 comprises two feedback paths through a feedback subsystem 409. A feedback path/channel (not shown) from the opposite end of the optical fibers may also be used.

In a first closed-loop control path, a predistortion function (P(x)) is determined and adapted according to the input and/or the output of the external modulator 405 as detected by the feedback subsystem 409. The predistortion module 401 applies the predistortion function (P(x)) to a digital signal input. The transmit optical subsystem 403 is operable to receive the digital predistorted signal from the predistortion module 401 and generate a light beam having an intensity proportional to the digital predistorted signal. The light beam is modulated by external modulator 405 and transmitted over an optical channel 407. As the modulated, predistorted signal traverses the optical channel 407, it will experience the effects of chromatic dispersion. By the time the modulated, predistorted signal arrives at a receiver, the chromatic dispersion transforms the modulated, predistorted signal back into a near-ideal modulated signal that the receiver intended to see. An estimate of the dispersion caused by the optical channel is modeled may be modelled as C(x). The Optical Channel Model (C(x)) may be predetermined or may be dynamically adapted according to parameters such as temperature or channel length. Frequencies that travel faster may be delayed according to this dispersion model, thereby compensating for dispersion over an optical fiber.

The external modulator 405 modulates the phase and/or frequency of the optical signal that is set over the optical channel 407. The modulation of the phase and/or frequency is a variation of the optical carrier frequency. This frequency variation (i.e., chirp) can be modelled in the feedback subsystem 409 and/or the predistortion model. A model (M(x)) of the external modulator 405 may be determined according to the input and the output of the external modulator 405. Alternatively, the model (M(x)) of the external modulator 405 may be stored in the feedback subsystem 409 and/or the predistortion model.

In a second closed-loop control path, the amplitude of the light into the fiber 407 may be controlled in a second closed-loop control path. In the second control path, the relationship between the input and the output of the external modulator 405 is input to an amplitude feedback module 413. The amplitude of the output of the external modulator 405 may be detected by the feedback subsystem 409 using direct detection. The amplitude feedback module 413 may control the external modulator 405 through a DAC and a suitable driver. The external modulator 405 may counteract the resulting amplitude shift from the first control loop, thereby generating a constant envelope optical signal into the fiber 407.

The first closed-loop control path may control frequency variation, and the second closed-loop control path may control amplitude variation. Together, the first closed-loop control path and the second closed-loop control path minimize dispersion and reduce the chirp detected out of the fiber. The feedback subsystem 409 may adapt the two control paths to control the amplitude of the light into the fiber according to dynamic models. A model of the transmit optical subsystem 403 may estimate the optical output, T(x), as a function of a digital predistorted input, x. A model of the external modulator 405 may estimate the modulated output, M(x), as a function of the optical input, x, from the transmit optical subsystem 403. A model of the optical channel 407 may estimate a dispersed output, C(x), as a function of the modulated, predistorted input, x, from the external modulator 405. The models T(x), M(x) and C(x) may be nonlinear and/or temperature dependent. The nonlinearity of T(x) and M(x) may be determined by, for example, comparing monitored signals (e.g., pilots or decoded data) with expected signals. The optical link 407 may be modelled by coefficients of a Volterra series and a temperature of the optical link 407. The temperature may be indirectly determined based on known behavior of the optical components over temperature and/or determined directly from a temperature measurement reported by the optical components.

The dual feedback loops provided by the feedback subsystem 409 may be utilized to configure both the transmit optical subsystem 403 and the external modulator 405. The system 300 therefore cascades direct modulation with external modulation 405 to provide a constant light amplitude into the fiber 407 with configurable wavelength. In this manner, 80 km direct detection is enabled, and dispersion effects such as DSB nulls may be mitigated, as the frequency transmitted can be accurately controlled without the shift in amplitude into the fiber.

Figure 4:
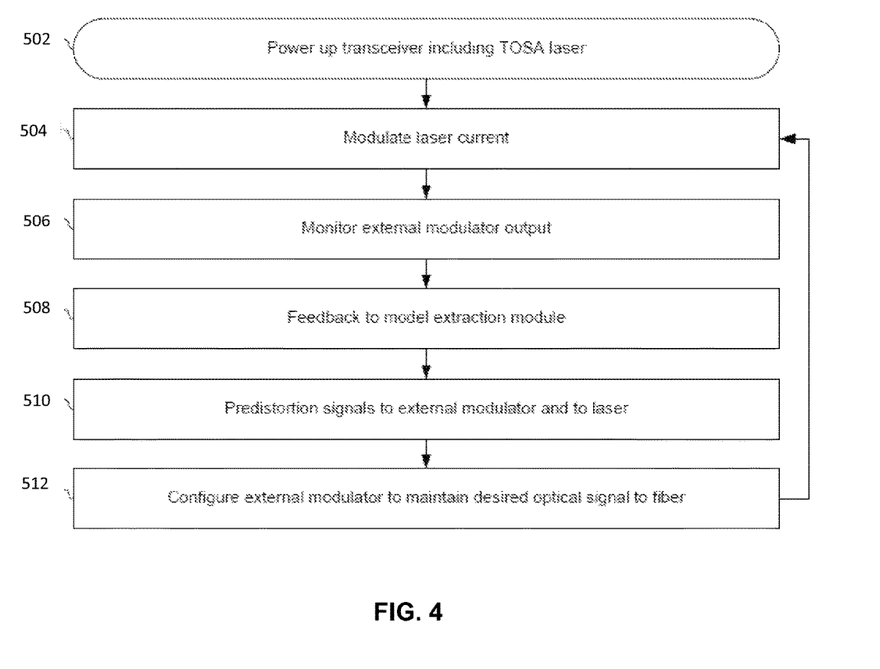
FIG. 4 is a flowchart illustrating operation of a hybrid direct modulated/external modulation optical transceiver in accordance with aspects of this disclosure.

FIG. 4 is a flowchart illustrating operation of a hybrid direct modulated/external modulation optical transceiver in accordance with aspects of this disclosure. In block 502, the transceiver may be powered up including the TOSA laser. In block 504, a data signal may generated by modulating the laser current.

In block 506, the output of the external modulator may be sensed by a monitor photodetector. In addition a second photodetector may directly monitor the laser output. In block 508, the output of the monitor photodetector(s) may be communicated to the model extraction module.

In block 510, as the change in laser current changes the frequency in a desired or predetermined way, the resulting change in amplitude may be eliminated utilizing the external modulator, and predistortion signals may be communicated to the external modulator for this purpose. In addition, the predistortion and chirp control may continue to configure the output frequency with amplitude, i.e., chirp, while in block 512, the external modulator predistortion and amplitude control may keep the amplitude constant at the output of the external modulator for a given desired output.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

The present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system comprising:
    a digital signal processor operable to modify an input digital signal to produce a digital predistorted signal, wherein the modification comprises an amplitude shift;
    a transmit optical subsystem operable to generate an optical signal from the digital predistorted signal;
    a feedback subsystem operable to determine one or more characteristics of the optical signal, wherein the feedback subsystem is operable to control the modification applied to the input digital signal by the digital signal processor according to the one or more characteristics of the optical signal; and
    an external modulator operable to modulate the optical signal, wherein the amplitude of the modulated optical signal is controlled by the feedback subsystem according to the amplitude shift.

2. The system of claim 1, wherein the one or more characteristics of the optical signal comprise a nonlinear relationship between the digital predistorted signal and the optical signal.

3. The system of claim 1, wherein the feedback subsystem is operable to determine the modification of the input digital signal that reduces a dispersion characteristic of an optical channel.

4. The system of claim 1, wherein the one or more characteristics of the optical signal comprise a temperature dependency.

5. The system of claim 1, wherein the feedback subsystem comprises a backside monitor photodiode.

6. The system of claim 1, wherein the one or more characteristics of the optical signal are dependent on a temperature of a laser diode in the transmit optical subsystem, wherein the temperature is determined according to a plurality of Volterra series coefficients and a comparison between the optical signal and an expected signal.

7. The system of claim 1, wherein the feedback subsystem is operable to determine the one or more characteristics according to the modulated optical signal.

8. The system of claim 1, wherein the feedback subsystem comprises a model extraction module operable to determine an optical channel model based on a feedback path in the transmit optical subsystem.

9. The system of claim 1, wherein a high-speed, high-bandwidth photodiode intermittently monitors the external modulator.

10. A method for optical communications, wherein the method comprises:
    modifying an input digital signal to produce a digital predistorted signal, wherein the modification comprises an amplitude shift;
    generating an optical signal from the digital predistorted signal;
    determining one or more characteristics of the optical signal;
    controlling the modification applied to input digital signal according to the one or more characteristics of the optical signal; and
    controlling an external modulation of the optical signal according to the modification of the input digital signal.

11. The method of claim 10, wherein the method comprises estimating a dispersion of the digital predistorted signal over an optical channel.

12. The method of claim 10, wherein the method comprises determining a temperature according to a predetermined behavior of the optical signal and updating the modification of the input digital signal according to the temperature.

13. The method of claim 10, wherein determining one or more characteristics of the optical signal comprises intermittently monitoring an external modulator using a high-speed, high-bandwidth photodiode.

14. The method of claim 10, wherein determining one or more characteristics of the optical signal comprises modelling the modulation of the optical signal.

15. The method of claim 10, wherein determining one or more characteristics of the optical signal comprises determining the modification of the input digital signal that compensates for dispersion over an optical fiber.

16. A non-transitory machine-readable storage having stored thereon, a computer program having at least one code section for enabling optical communications, the at least one code section being executable by a machine for causing the machine to perform operations comprising:
    modifying an input digital signal to produce a digital predistorted signal, wherein the modification comprises an amplitude shift;
    generating an optical signal according to the digital predistorted signal;
    determining one or more characteristics of the optical signal;
    controlling the modification applied to input digital signal according to the one or more characteristics of the optical signal; and
    controlling an external modulation of the optical signal to counteract the amplitude shift of a modulated optical signal, wherein the control of the external modulation is based on the modification of the input digital signal that produces the digital predistorted signal.

17. The non-transitory_machine-readable storage of claim 16, wherein the at least one code section is executable to perform the operation of determining a dispersion of the digital predistorted signal over an optical channel.

18. The non-transitory_machine-readable storage of claim 17, wherein the at least one code section is executable to perform the operation of determining a temperature according to a predetermined behavior of the optical signal and updating the modification applied to input digital signal according to the temperature.

19. The non-transitory_machine-readable storage of claim 16, wherein the at least one code section is executable to intermittently monitor an external modulator according to the output of a high-speed, high-bandwidth photodiode.

20. The non-transitory_machine-readable storage of claim 16, wherein the at least one code section is executable to determine the modification of the input digital signal that compensates for dispersion over an optical fiber.

* * * * *